(12) United States Patent
Hashimoto et al.

(10) Patent No.: US 8,126,035 B2
(45) Date of Patent: Feb. 28, 2012

(54) DATA TRANSFER SYSTEM, WIRELESS COMMUNICATION DEVICE, WIRELESS COMMUNICATION METHOD, AND COMPUTER PROGRAM

(75) Inventors: Yuhei Hashimoto, Tokyo (JP); Fumihiro Nishiyama, Saitama (JP); Yasunori Maeshima, Tokyo (JP)

(73) Assignee: Sony Corporation, Tokyo (JP)

( * ) Notice: Subject to any disclaimer, the term of this patent is extended or adjusted under 35 U.S.C. 154(b) by 1025 days.

(21) Appl. No.: 11/544,761

(22) Filed: Oct. 10, 2006

(65) Prior Publication Data

US 2007/0053412 A1 Mar. 8, 2007

Related U.S. Application Data

(63) Continuation-in-part of application No. 11/496,430, filed on Aug. 1, 2006.

(30) Foreign Application Priority Data

Aug. 18, 2005 (JP) ................................. 2005-238018
Aug. 9, 2006 (JP) ................................. 2006-217438

(51) Int. Cl.
 *H04B 1/38* (2006.01)
 *H04L 5/16* (2006.01)
(52) U.S. Cl. .................. 375/219; 455/41.1; 455/41.2
(58) Field of Classification Search .................. 375/219; 455/41.1–41.2
See application file for complete search history.

(56) References Cited

U.S. PATENT DOCUMENTS

| | | | |
|---|---|---|---|
| 6,111,536 A | 8/2000 | Richards et al. | |
| 6,496,543 B1 | 12/2002 | Zehavi | |
| 6,937,667 B1 | 8/2005 | Fullerton et al. | |
| 7,139,529 B2 | 11/2006 | Rekimoto et al. | |
| 2003/0220765 A1* | 11/2003 | Overy et al. | 702/158 |
| 2004/0068744 A1* | 4/2004 | Claussen et al. | 725/81 |
| 2004/0235499 A1 | 11/2004 | Tanaka et al. | |
| 2005/0088344 A1* | 4/2005 | Saitou et al. | 343/700 MS |
| 2005/0117750 A1 | 6/2005 | Rekimoto et al. | |

(Continued)

FOREIGN PATENT DOCUMENTS

JP 2001-506066 5/2001

(Continued)

OTHER PUBLICATIONS

Nikkei Electronics Issue No. 2002.3.11, "Ubugoe wo ageru musen no kakumeiji Ultra Wideband" pp. 55 to 66 (2003).

(Continued)

*Primary Examiner* — Curtis Odom
(74) *Attorney, Agent, or Firm* — Finnegan, Henderson, Farabow, Garrett & Dunner, L.L.P.

(57) ABSTRACT

In a data transfer system in which wireless data transmission is carried out between a first device and a second device that each has a UWB wireless device, the data transfer system includes a ranging unit that is provided in the UWB wireless device of at least one of the first and second devices and measures a distance to the other of the first and second devices; a distance determination unit that determines, based on a measurement result by the ranging unit, whether or not the distance between the first and second devices has been within such a predetermined range that a predetermined transmission rate and a predetermined transmission quality are obtained by UWB communication; and a data transfer unit that executes data transmission between the first and second devices in response to a determination by the distance determination unit that the distance between the first and second devices has been within the predetermined range.

25 Claims, 9 Drawing Sheets

U.S. PATENT DOCUMENTS

| | | | |
|---|---|---|---|
| 2005/0147130 A1* | 7/2005 | Hurwitz et al. | 370/503 |
| 2005/0169232 A1* | 8/2005 | Sakoda et al. | 370/347 |
| 2005/0288003 A1* | 12/2005 | Matsumura | 455/418 |
| 2006/0159158 A1* | 7/2006 | Moore et al. | 375/130 |
| 2006/0194541 A1 | 8/2006 | Rekimoto et al. | |

FOREIGN PATENT DOCUMENTS

| | | |
|---|---|---|
| JP | 2002-204239 | 7/2002 |
| JP | 2002-517001 | 6/2003 |
| JP | 2003-224569 | 8/2003 |
| JP | 2003-529273 | 9/2003 |
| JP | 2004-015179 | 1/2004 |
| JP | 2004-151179 | 5/2004 |
| JP | 2004-258009 | 9/2004 |
| JP | 2004-298815 | 10/2004 |
| JP | 2005-086531 | 3/2005 |
| JP | 2005-130292 | 5/2005 |
| JP | 2005-136897 | 5/2005 |
| WO | WO 2004/038959 A1 | 5/2004 |

OTHER PUBLICATIONS iPod Fan, iPod, http://pcweb.mycom.co.ip/news/2002/09/03/10.html, 2 pages (2002).

* cited by examiner

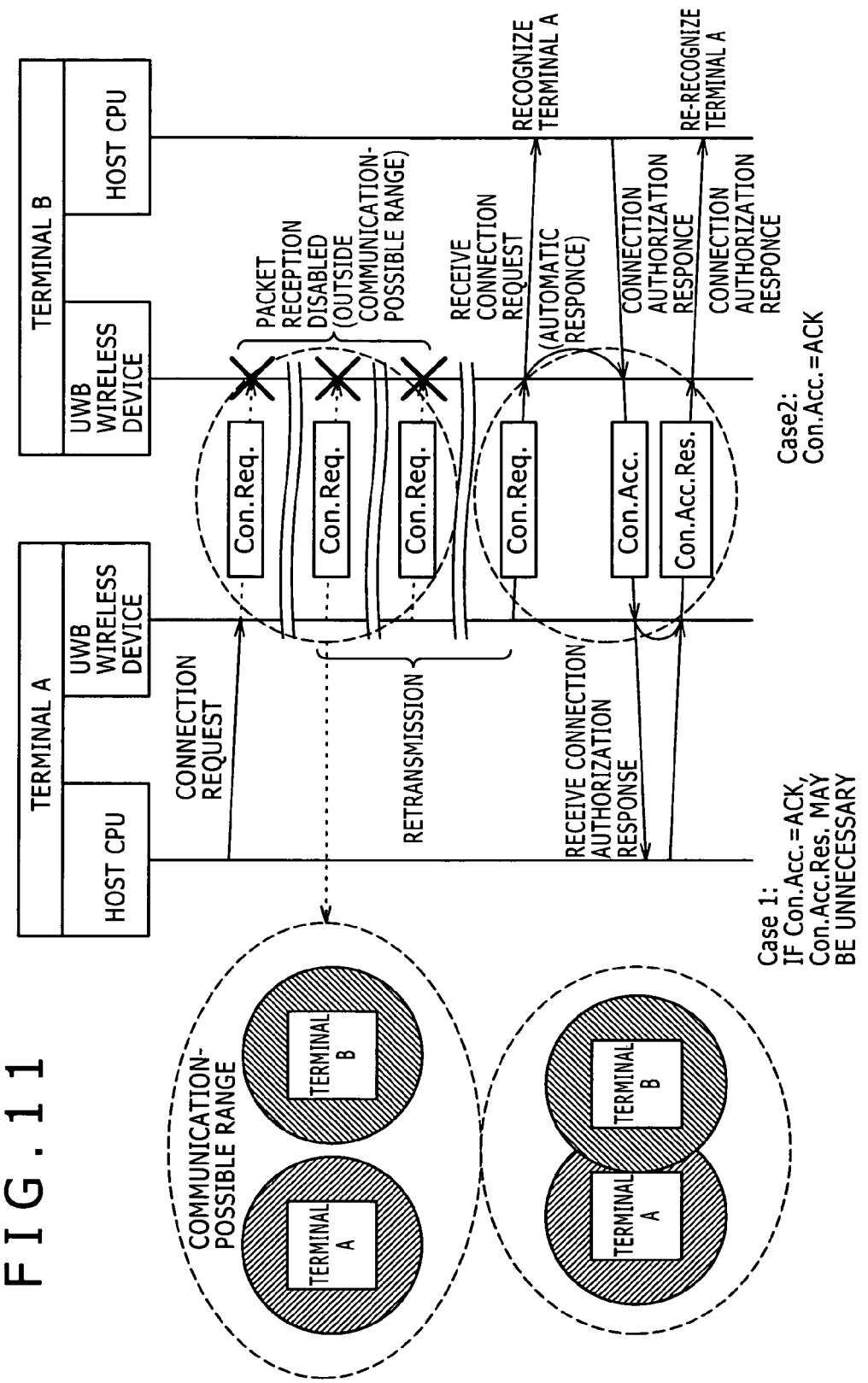

DATA TRANSFER SYSTEM, WIRELESS COMMUNICATION DEVICE, WIRELESS COMMUNICATION METHOD, AND COMPUTER PROGRAM

CROSS REFERENCES TO RELATED APPLICATIONS

This application is a Continuation-In-Part of U.S. application Ser. No. 11/496,430, filed Aug. 1, 2006, in the name of Yuhei HASHIMOTO, the content of which is incorporated herein by reference.

The present invention contains subject matter related to Japanese Patent Application JP 2005-238018 filed with the Japanese Patent Office on Aug. 18, 2005, the entire contents of which being incorporated herein by reference.

BACKGROUND OF THE INVENTION

1. Field of the Invention

The present invention relates to a data transfer system, a wireless communication device, a wireless communication method, and a computer program that each allow high-capacity data to be transmitted between information apparatuses at a high speed in a short period. The invention particularly relates to a data transfer system, a wireless communication device, a wireless communication method, and a computer program that each allow consumer apparatuses very close to each other to mutually transmit high-capacity data such as image data and music data by wireless at a high speed.

More specifically, the invention relates to a data transfer system, a wireless communication device, a wireless communication method, and a computer program that each allow construction of a device area network for implementing high-quality data transmission that employs UWB communication and has a high transmission rate and a low error rate. The invention particularly relates to a data transfer system, a wireless communication device, a wireless communication method, and a computer program that each allow high-transmission-rate and high-quality data transmission in a device area network employing the UWB communication, with avoiding deterioration of the signal quality in the wireless section associated with an increase in the distance between the apparatuses.

2. Description of Related Art

In recent years, a wireless communication system called ultra wideband (UWB) communication, which employs a very wide frequency band of 3.1 to 10.6 GHz, has been attracting attention. The UWB communication, which is contemplated to be used for a PAN (Personal Area Network) in which the communication distance is about 10 m, has a transmission speed of about 100 Mbps, and the practical use thereof as a wireless communication system realizing short-range ultra-high-speed transmission is expected (refer to e.g. Nikkei Electronics Issue No. Mar. 11, 2002. "Ubugoe wo ageru musen no kakumeiji Ultra Wideband" p. 55 to 66).

For example, in IEEE 802.15.3 and so forth, transmission system for data with a packet structure including a preamble is devised as an access control system in the UWB communication. Furthermore, Intel Corporation (U.S.) contemplates, as an application of the UWB communication, a wireless version of USB (Universal Serial Bus), which is prevalent as a general-purpose interface for personal computers.

The UWB communication is a wireless communication system for short-range communication because of its regulated low transmission power, but allows high-speed wireless transmission. Therefore, as a consumer-use system, the UWB communication can couple, by wireless, mobile digital apparatuses such as digital cameras and music reproduction apparatuses to televisions and personal computers with short distances therebetween, and permits high-speed data transmission of music content and image content therebetween.

In the past, in order to transfer image and music data between plural information apparatuses, typically the apparatuses are interconnected via a general-purpose cable such as an AV cable or USB cable for the data communication, or a medium such as a memory card is physically moved between the apparatuses. In contrast, if data transfer between apparatuses employing wireless interfaces is allowed, there is no need to change the connectors and route a cable every data transmission, which offers high convenience. In recent years, mobile apparatuses that are provided with a wireless communication function for the purpose of exchanges of image and music data with a personal computer have also emerged (refer to e.g. http://pcweb.mycom.co.jp/news/2002/09/03/10.html).

If the above-described UWB communication system is used for the wireless data exchange between apparatuses, wireless transmission of high-capacity data at a transmission rate of about 10 Mbps can be realized although the allowable communication distance is short. Alternatively, it is also possible to apply infrared communication or an IEEE802 wireless LAN system of course. However, since the UWB communication is a short-range and high-capacity wireless communication system, high-speed data transmission in an ultra-short-distance area, such as an ultra-high-speed and short-range DAN (Device Area Network) including a storage device, can be realized by the UWB communication. For example, the UWB communication allows high-capacity data such as moving image data and music data corresponding to music in one CD to be transferred at a high speed in a short period.

Transmission systems employing a UWB low band of 3.1 to 4.9 GHz are also being intensively developed because of advantages thereof that data transmission over 100 Mbps is possible without occupying the transmission band of 3.1 to 10.6 GHz, and that an RF circuit can be fabricated easily. The present inventor is considering the data transmission system utilizing the UWB low band as one of effective wireless communication techniques incorporated into mobile apparatuses.

However, communication by use of wireless signals involves a problem in that the signal quality in the wireless section is deteriorated in association with influence of peripheral reflectors and an increase in the distance between the apparatuses carrying out the communication. In particular, this signal quality deterioration makes it difficult to implement high-transmission-rate communication and high-quality transmission with a low error rate.

SUMMARY OF THE INVENTION

There is a need for the present invention to provide excellent data transfer system, wireless communication device, wireless communication method, and computer program that each allow consumer apparatuses very close to each other to mutually transmit, by wireless, high-capacity data such as image data and music data at a high speed by use of the UWB communication system.

Another need of the invention is to provide excellent data transfer system, wireless communication device, wireless communication method, and computer program that each allow construction of a device area network for implementing high-quality data transmission that employs the UWB communication and has a high transmission rate and a low error rate.

Further another need of the invention is to provide excellent data transfer system, wireless communication device, wireless communication method, and computer program that each allow high-transmission-rate and high-quality data transmission in a device area network employing the UWB communication, with avoiding deterioration of the signal quality in the wireless section associated with an increase in the distance between the apparatuses.

According to a first embodiment of the present invention, there is provided a data transfer system in which wireless data transmission is carried out between a first device and a second device that each includes a UWB wireless device. The data transfer system includes ranging means that is provided in the UWB wireless device of at least one of the first and second devices and measures the distance to the other of the first and second devices, and distance determination means that determines, based on a measurement result by the ranging means, whether or not the distance between the first and second devices has been within such a predetermined range that a predetermined transmission rate and a predetermined transmission quality can be obtained by UWB communication. The data transfer system also includes data transfer means that executes data transmission between the first and second devices in response to a determination by the distance determination means that the distance between the first and second devices has been within the predetermined range.

The term "system" refers to an entity arising from logical collection of a plurality of devices (or functional modules that realize specified functions), and it does not matter whether or not the respective devices or functional modules are included in a single casing. This point also applies to the following descriptions.

The present invention relates to a data transfer system for constructing a short-range device area network by use of UWB communication. According to this kind of the data transfer system, data can be transferred between apparatuses by use of wireless interfaces. Therefore, there is no need to change the connectors and route a cable therebetween every data transmission, which offers high convenience. In addition, the UWB communication allows realization of high-speed data transmission in an ultra-short-distance area. For example, high-capacity data such as moving image data and music data corresponding to music in one CD can be transferred at a high speed in a short period.

However, communication by use of wireless signals involves a problem in that the signal quality in the wireless section is deteriorated in association with influence of peripheral reflectors and an increase in the distance between the apparatuses carrying out the communication. In particular, this signal quality deterioration makes it difficult to implement high-transmission-rate communication and high-quality transmission with a low error rate.

In contrast, the data transfer system according to an embodiment of the present invention utilizes a characteristic that the distance between wireless devices can be measured at high accuracy since communication by use of UWB wireless signals employs high-frequency (4 GHz) signals. Thus, in the data transfer system, high-capacity data such as music data and image data is transferred in a short period at a high speed when consumer apparatuses each including a UWB wireless communication device have come within a predetermined distance from each other.

The UWB communication employs ultra-short pulses and thus has a high time resolution, which permits implementation of ranging in which radar and positioning are executed. That is, the system employing the UWB communication is allowed to have both a function of high-speed data transmission over 100 Mbps and a ranging function.

Therefore, in the data transfer system according to an embodiment of the present invention, data transfer is started in response to merely the operation of "bringing closer" for the apparatus by utilizing the ranging function of the UWB wireless device. Accordingly, high-transmission-rate communication and high-quality transmission with a low error rate can be achieved.

Furthermore, in the data transfer system according to an embodiment of the present invention, since wireless transmission can be executed in the state in which the apparatuses are very close to each other, wireless transmission at a high transmission rate is allowed without the dependency of the transmission on the peripheral environment, such as deterioration of the signal quality in the wireless section associated with influence of peripheral reflectors and an increase in the distance between the apparatuses carrying out the communication.

The data transfer system according to an embodiment of the present invention can be applied to a system in which each of a small mobile apparatus such as a digital camera or digital audio player and an apparatus such as a casing or cradle that houses this kind of a mobile apparatus with fixing it is provided with a UWB wireless device so that high-capacity data such as image data and music data is transmitted between these apparatuses.

For example, in the state in which a digital camera is housed in a cradle, antennas in the UWB wireless devices included in both the apparatuses are fixed in such a posture that the main radio wave directions thereof are oriented toward each other and with such an ultra-short distance therebetween that the peripheral environment has no effect on the communication between the antennas. Accordingly, when the digital audio player is housed in the cradle, the state in which the apparatuses have come within a predetermined distance from each other is detected by the ranging function of the UWB wireless device, and hence wireless data transmission operation is started, so that high-transmission-rate communication and high-quality transmission with a low error rate can be achieved.

According to a second embodiment of the invention, there is provided a data transfer system in which wireless data transmission is carried out between a first device and a second device that each includes a UWB wireless device. The data transfer system includes recognition means that is included in at least one of the first and second devices and recognizes the existence of a communication target wireless device, and data transfer means that starts data transmission between the first and second devices in response to a recognition of the existence of one of the first and second devices by the other of the first and second devices through the recognition means. In this data transfer system, at least one of the first and second devices may detect a communication target apparatus by using a polling function to thereby allow the recognition means to recognize the existence of the communication target wireless device.

The present invention relates to a data transfer system in which data transfer is started in response to the operation of "bringing closer" for apparatuses each including a UWB wireless device. However, the distance to a communication target does not necessarily need to be measured by use of a ranging function of the UWB communication like in the first embodiment of the invention. The second embodiment of the invention is configured so that wireless data transmission operation is started after it has been acknowledged that a communication target apparatus including a UWB wireless device exists within such a distance that communication thereto is possible by using a polling function or the like. The second embodiment also can assure high-transmission-rate and high-quality data transmission similarly. This is because it is considered that also in the communication range in which the polling is possible, there is no dependency of the transmission on the peripheral environment, such as deterioration of the signal quality in the wireless section associated with influence of peripheral reflectors and an increase in the distance between the apparatuses carrying out the communication.

According to a third embodiment of the invention, there is provided a computer program that is described in a computer readable format so that processing for carrying out wireless data transmission between apparatuses by use of UWB communication is executed on a computer system. The computer program causes the computer system to execute the steps of measuring the distance to a communication target apparatus based on a transmitted or received UWB signal, determining, based on a measurement result in the measuring, whether or not the distance to the communication target apparatus has been within such a predetermined range that a predetermined transmission rate and a predetermined transmission quality are obtained by UWB communication, and executing short-range data transmission with a throughput equal to or higher than a predetermined throughput by UWB communication in response to a determination in the determining that the distance to the communication target apparatus has been within the predetermined range.

The computer program according to the third embodiment is defined as a computer program that is described in a computer readable format so as to realize predetermined processing on a computer system. In other words, when the computer program according to the third embodiment is installed in a computer system, cooperative effects are exerted on the computer system, so that the system operates as a wireless communication device. By activating a plurality of such wireless communication devices to thereby construct a device area network, the same effects and advantages as those by the data transfer system according to the first embodiment can be achieved.

According to a fourth embodiment of the invention, there is provided a computer program that is described in a computer readable format so that processing for carrying out wireless data transmission between apparatuses by use of UWB communication is executed on a computer system. The computer program causes the computer system to execute the steps of recognizing the existence of a communication target apparatus that is within such a distance that communication to the communication target apparatus is possible, and starting data transmission by use of the UWB communication in response to a recognition of the communication target apparatus through execution of the recognizing.

The computer program according to the fourth embodiment is defined as a computer program that is described in a computer readable format so as to realize predetermined processing on a computer system. In other words, when the computer program according to the fourth embodiment is installed in a computer system, cooperative effects are exerted on the computer system, so that the system operates as a wireless communication device. By activating a plurality of such wireless communication devices to thereby construct a device area network, the same effects and advantages as those by the data transfer system according to the second embodiment can be achieved.

The embodiments of the invention can provide excellent data transfer system, wireless communication device, wireless communication method, and computer program that each allow construction of a device area network for implementing high-quality data transmission that employs UWB communication and has a high transmission rate and a low error rate.

Furthermore, the embodiments of the invention can provide excellent data transfer system, wireless communication device, wireless communication method, and computer program that each allow high-transmission-rate and high-quality data transmission in a device area network employing the UWB communication, with avoiding deterioration of the signal quality in the wireless section associated with an increase in the distance between the apparatuses.

The data transfer system according to an embodiment of the present invention allows data to be transferred rapidly and easily without the need to provide a wire cable between the apparatuses to carry out the data transfer.

In the present invention, apparatuses to carry out data transfer each employs a UWB wireless device, and thus data transfer can be executed at a higher speed in a shorter period than the speeds and periods in other wireless data transmission systems.

In the data transfer system according to an embodiment of the present invention, data transfer can be started merely by implementing the operation of "bringing closer" for apparatuses by utilizing the ranging function of a UWB wireless device. Therefore, by providing UWB wireless devices for both of a mobile apparatus such as a digital camera or digital audio player and a cradle that fixes or houses the mobile apparatus, wireless transmission can be executed in the state in which the mobile apparatus is fixed to the cradle and thus they are very close to each other. Accordingly, wireless transmission at a high transmission rate can be carried out across such an ultra-short distance that the wireless transmission does not depend on the peripheral environment.

Still other needs, features and advantages of the present invention will become apparent from the following more detailed description based on an embodiment of the invention and the accompanying drawings.

BRIEF DESCRIPTION OF THE DRAWINGS

FIG. 11 is a diagram showing one example of an operation procedure of an apparatus for detecting a communication target apparatus by using a polling function.

DETAILED DESCRIPTION OF THE PREFERRED EMBODIMENTS

An embodiment of the present invention will be described in detail below with reference to the accompanying drawings.

Figure 1:
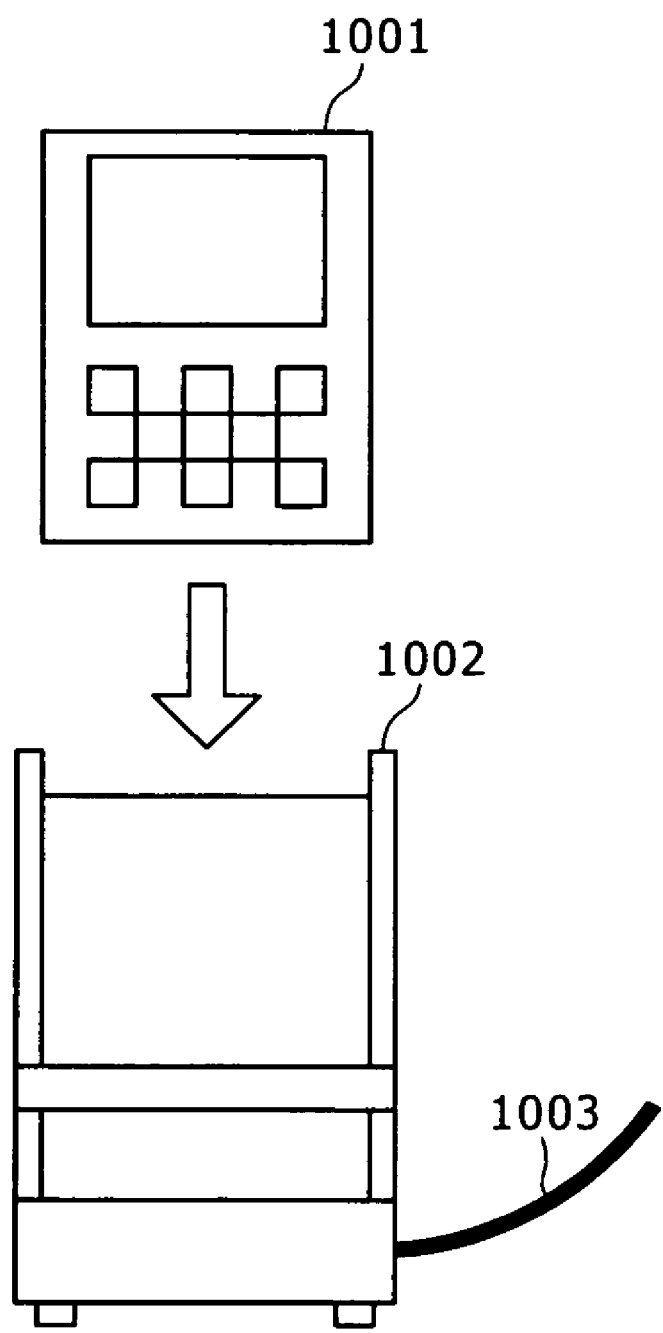
FIG. 1 is a diagram illustrating a data transfer system according to one embodiment of the present invention.

FIG. 1 illustrates a data transfer system according to one embodiment of the invention. The system shown in the drawing is constructed of a digital audio player 1001 that includes a UWB wireless device and a cradle 1002 that also includes a UWB wireless device. The cradle 1002 houses the digital audio player with fixing it therein.

Between the digital audio player 1001 and the cradle 1002, transmission of high-capacity data such as music data is implemented by short-range communication employing the UWB. The cradle 1002 is coupled via a wire cable 1003 or the like to a personal computer (now shown) as a storage unit for music data.

Figure 2:
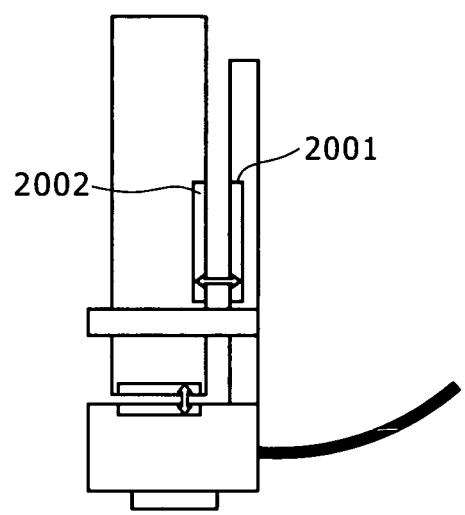
FIG. 2 is a diagram illustrating the state in which a digital audio player 1001 has been housed in a cradle 1002.

FIG. 2 illustrates the state in which the digital audio player 1001 has been housed in the cradle 1002. In this state, antennas 2001 and 2002 in the UWB wireless devices contained in both the apparatuses 1001 and 1002, respectively, are fixed in such a posture that the main radio wave directions thereof are oriented toward each other and with such an ultra-short distance therebetween that the peripheral environment has no effect on the communication between the antennas.

The UWB communication allows high-transmission-rate and high-quality data transmission in an ultra-short-distance area. Furthermore, the UWB communication employs ultra-short pulses and thus has a high time resolution, which permits implementation of ranging. That is, the UWB communication is allowed to have both a function of high-speed data transmission over 100 Mbps and a ranging function.

Therefore, in the data transfer system according to one embodiment of the invention, an information apparatus such as a mobile apparatus utilizes the ranging function of the UWB wireless device to thereby measure the distance to the communication target, and the data transfer is started in response to the operation of "bringing closer" for the apparatus. Accordingly, when the digital audio player 1001 is housed in the cradle 1002, the state in which the apparatuses have come within a predetermined distance from each other is detected by the ranging function of the UWB wireless device, and hence wireless data transmission operation is started, so that high-transmission-rate communication and high-quality transmission with a low error rate can be achieved.

Since wireless transmission can be implemented in the state in which the apparatuses are very close to each other as described above, wireless transmission at a high transmission rate is allowed without the dependency of the transmission on the peripheral environment, such as deterioration of the signal quality in the wireless section associated with influence of peripheral reflectors and an increase in the distance between the apparatuses carrying out the communication.

Figure 3:
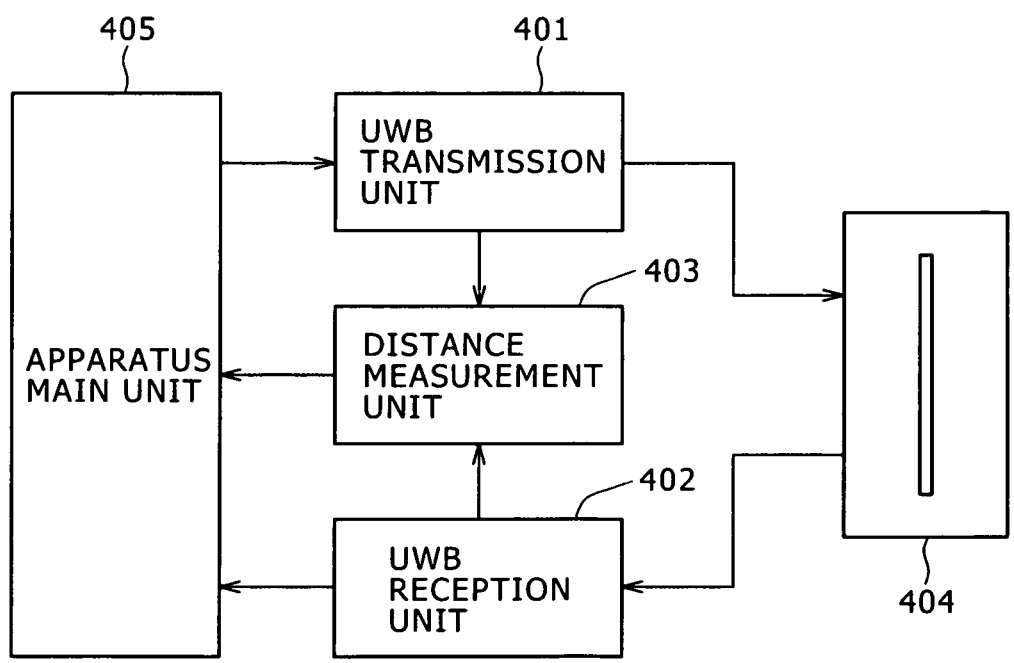
FIG. 3 is a block diagram schematically illustrating one example of the functional configuration of a UWB wireless device included in apparatuses such as a digital audio player 1001 and a cradle 1002.

FIG. 3 schematically illustrates one example of the functional configuration of a UWB wireless device included in apparatuses such as the digital audio player 1001 and the cradle 1002. The apparatus shown in the drawing includes a UWB transmission unit 401, a UWB reception unit 402, a distance measurement unit 403, an ultra-short-range wideband antenna 404, and an apparatus main unit 405. The apparatus has a function for starting data transfer in response to the detection of a distance by the apparatus.

The UWB transmission unit 401 and the UWB reception unit 402 execute the following processing: UWB RF processing of executing modulation/demodulation processing for transmission signals; UWB baseband processing that includes modulation/demodulation processing, synchronization processing and propagation path measurement for baseband signals; UWB MAC (Media Access Control) layer processing of executing access control and adaptive control of the transmission rate; and UWB DLC (Data Link Control) layer processing of executing management of neighboring nodes, encryption, and authentication processing.

In the present embodiment, the ranging function for measuring the distance between the apparatuses every time information transmission is implemented is realized through the UWB baseband processing in the UWB transmission unit 401 and the UWB reception unit 402. A ranging method employing the UWB communication is described in detail in e.g. Japanese Patent Laid-open No. 2004-258009 (Japanese Patent No. 3649404), which has been already assigned to the present assignee. Although it is necessary that the UWB wireless device contained in the apparatus, such as a digital camera or cradle, that starts data transmission, be provided with the ranging function, the gist of the invention is not limited by any particular ranging method.

The transmission and reception of UWB signals by the UWB transmission unit 401 and the UWB reception unit 402 are carried out via the ultra-short-range wideband antenna 404. It is necessary that the ultra-short-range wideband antennas 404 disposed close to each other obtain favorable characteristics regarding both the reflection characteristic and coupling characteristic. This point will be described later.

The apparatus main unit 405 is constructed of a hardware module unique to control of communication operation in upper protocol layers and the apparatus itself such as a digital camera or cradle. The apparatus main unit 405 executes processing of sending transmission data to the UWB transmission unit 401, processing for received data sent from the UWB reception unit 402, and overall control of the entire device.

A description will be made on an operation procedure of an apparatus for starting data transfer in response to detection of the distance to a communication target by use of the UWB ranging function.

This operation procedure is based on an assumption that an RTS/CTS procedure is employed. Specifically, initially an RTS packet is transmitted from the UWB transmission unit 401 of the apparatus as the data transmission source to the apparatus as the data transmission destination, followed by return of a CTS packet from the data transmission destination apparatus that has received the RTS packet.

Upon reception of the CTS packet, the UWB reception unit 402 recognizes that the data transmission destination has been ready to receive packets, and the distance measurement unit 403 measures the distance from the data transmission destination apparatus based on the UWB signal that has carried the CTS packet.

Subsequently, if it has been confirmed that the CTS packet has been received without any trouble, and the distance from the data transmission destination apparatus is within such a range that high-transmission-rate and high-quality transmission is possible, the UWB transmission unit 401 executes transmission processing for transmission data prepared from the upper layer protocol.

In this manner, in the data transfer system according to the present embodiment, the apparatus to carry out data communication includes an antenna and a UWB wireless device that allow transmission of UWB wireless signals even across an ultra-short distance. Furthermore, the apparatus utilizes its UWB ranging function to thereby measure the distance between the terminals, and starts data transfer when the distance becomes the predetermined value.

The RTS/CTS procedure is a communication method for solving the hidden terminal problem in a wireless system by starting data transmission in response to sending of a transmission request packet RTS (Request To Send) from the data transmission source and receiving of an acknowledgement packet CTS (Clear To Send) from the data transmission destination. This communication procedure itself has no direct relation to the gist of the present invention, and hence a more detailed description therefor is omitted.

Figure 4:
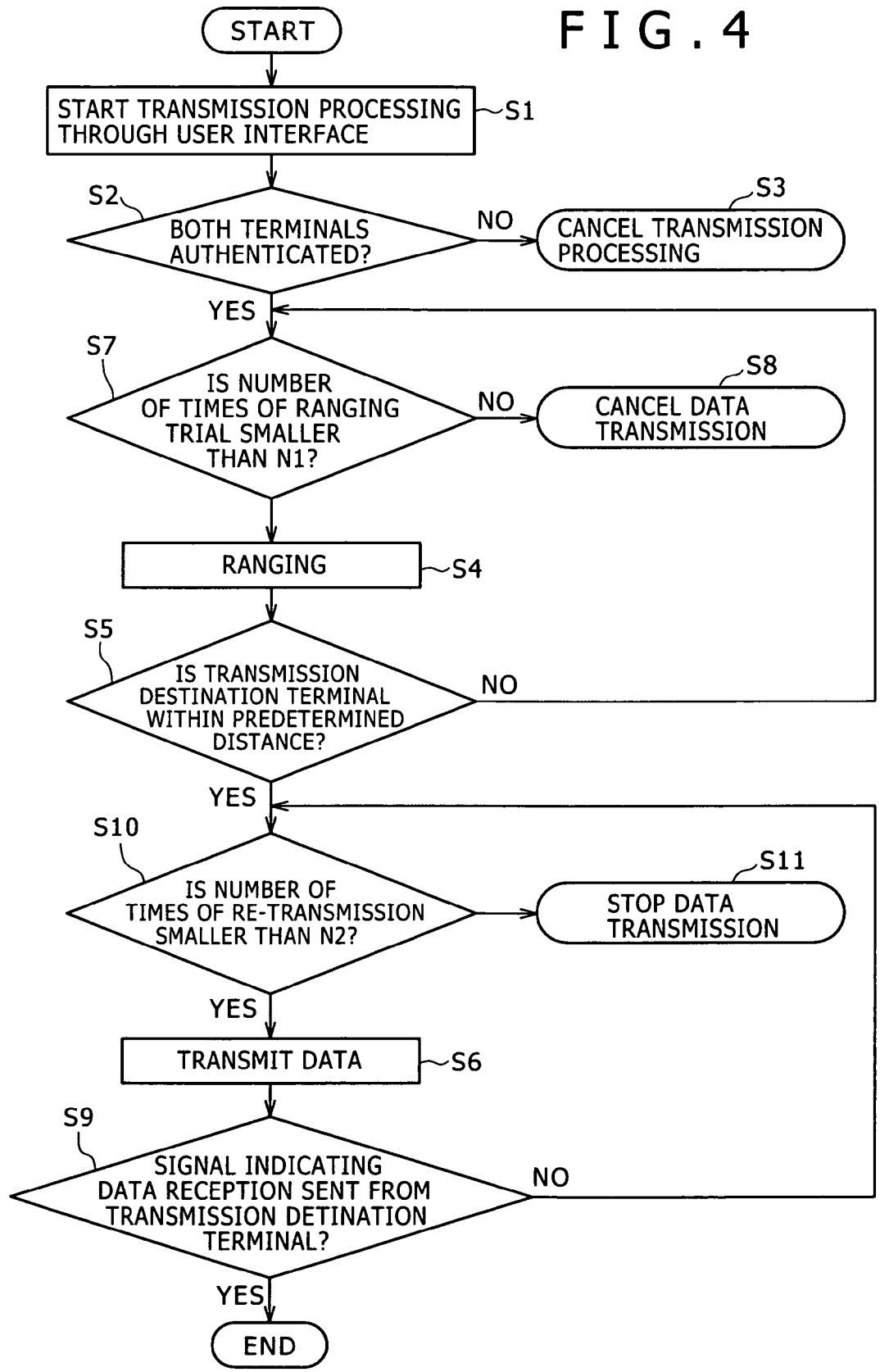
FIG. 4 is a flowchart showing a processing procedure for carrying out data transfer after detection of a distance by an apparatus.

FIG. 4 shows, in a flowchart format, a processing procedure for carrying out data transfer after detection of a distance by an apparatus. This flowchart is based on an assumption that data is transmitted from the digital audio player 1001 housed in the cradle 1002. However, it should be understood that the same procedure is available also when data is transmitted from the cradle 1002.

In response to user-interface operation such as pushing of a certain button by a user for the apparatus that is to transmit data first, transmission operation is started (step S1).

At this time, the apparatus to start the transmission operation notifies the other terminal of this start. Furthermore, authentication processing is executed between both the apparatuses if necessary (step S2). If the authentication processing for carrying out communication between the terminals results in failure, the subsequent data transmission processing is cancelled (step S3). The detailed procedure of the authentication processing has no direct relation to the gist of the present invention, and hence a description therefor is omitted.

At the time of the data transfer processing, the apparatuses need to be fixed with an ultra-short distance therebetween like when the digital audio player 1001 is set in the cradle 1002, in order to ensure high-speed and high-quality transfer operation for high-capacity data (i.e., the maximum throughput). In contrast, it is sufficient for the transmission rate in the authentication processing to be such that wireless communication between the apparatuses is possible, and an ultra-short distance and the maximum throughput are unnecessary unlike in the subsequent data transfer processing.

For example, Japanese Patent Laid-open No. 2004-298815 discloses a wireless communication system in which one terminal sends a registration request to the other terminal if the distance between the terminals is within a predetermined range. The authentication processing in the step S2 corresponds to this registration request. It should be well understood that the registration request and acknowledgment processing in this patent document are not implemented across such a distance between the terminals that the maximum throughput is obtained, and are different from the high-speed and high-quality data transfer across an ultra-short distance, set forth in the present invention.

Subsequently, by use of a UWB wireless signal, the distance between the apparatus to transmit data and the cradle fixing it is measured by the ranging function (step S4).

If it is determined that the distance to the terminal as the data transmission destination is equal to or smaller than a predetermined distance (e.g., 10 cm) due to the ranging function (step S5), the apparatus is triggered by this determination to start data transmission to the cradle (step S6).

On the contrary, if it is determined that the other terminal that has implemented authentication, i.e., the cradle, does not exist in the area within the specified distance, plural times of ranging are repeatedly tried thereafter (step S7), and the apparatus waits until the cradle comes into the area within the predetermined distance (e.g., until the apparatus is fixed to the cradle).

Subsequently, if the other terminal comes into the area within the predetermined distance, data transmission is started in the step S6.

In contrast, if it is determined that the other terminal does not exist in the area within the predetermined distance (e.g., the apparatus is not fixed to the cradle) even after the repetition of a specified number of times of the ranging operation, data transmission is cancelled (step S8), and the processing routine is terminated.

If the data transmission is carried out in the step S6, when the transmission of desired data selected by the user through a user interface in advance has been completed, the other terminal sends a wireless signal indicating that the data has been normally received, and the data transfer processing is ended (step S9).

In contrast, if the wireless signal indicating the normal reception of data is not sent from the other terminal even after a certain time interval, the apparatus implements data transmission again after a certain time interval (step S10). This retransmission operation is repeatedly carried out by a specified number of times. If the signal indicating the data reception is not sent even after this repetition, the data transmission processing is stopped (step S11), and the processing routine is terminated.

The present invention relates to a data transfer system in which data transfer is started in response to the operation of "bringing closer" for apparatuses each including a UWB wireless device. However, the distance to a communication target does not necessarily need to be measured by use of a ranging function of the UWB communication (or ranging function other than the UWB communication). As described above, if wireless data transmission operation is started by using the ranging function of the UWB wireless device in response to the state in which the apparatuses have come within a predetermined distance from each other, high-transmission-rate communication and high-quality transmission with a low error rate can be achieved. As a modification of this configuration, another system is also available in which wireless data transmission operation is started after it has been acknowledged that a communication target apparatus including a UWB wireless device exists within such a distance that communication thereto is possible by using a polling function or the like. This system also can assure high-transmission-rate and high-quality data transmission similarly. This is because it is considered that also in the communication range in which the polling is possible, there is no dependency of the transmission on the peripheral environment, such as deterioration of the signal quality in the wireless section associated with influence of peripheral reflectors and an increase in the distance between the apparatuses carrying out the communication.

A description will be made below on a data transfer system that employs a polling function as an alternative for a ranging function according to another embodiment of the invention.

Figure 10:
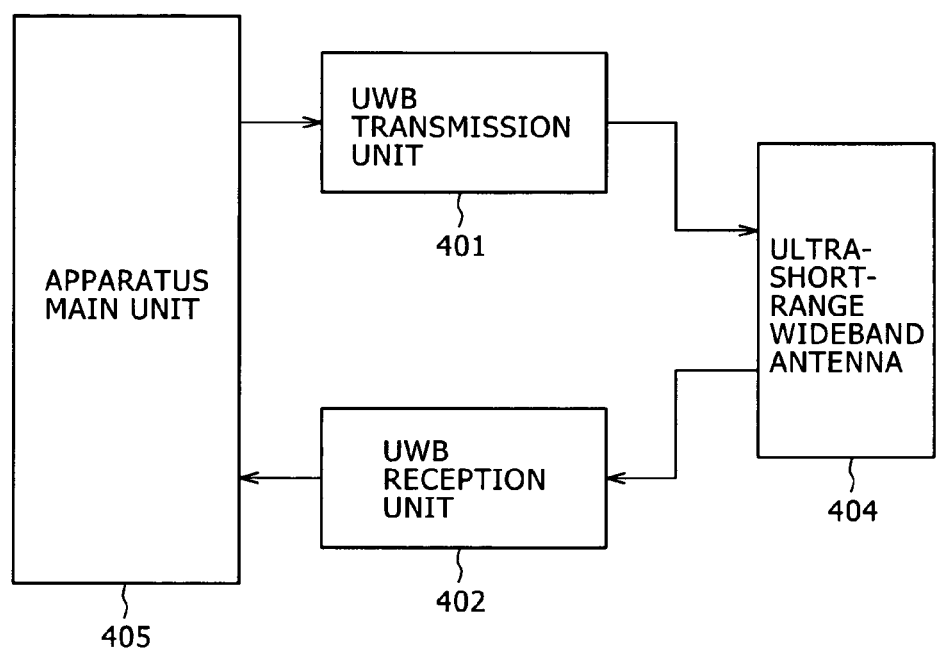
FIG. 10 is a block diagram schematically illustrating another example of the functional configuration of a UWB wireless device included in apparatuses such as the digital audio player 1001 and the cradle 1002.

FIG. 10 schematically illustrates another example of the functional configuration of a UWB wireless device included in apparatuses such as the digital audio player 1001 and the cradle 1002. The apparatus shown in the drawing includes a UWB transmission unit 401, a UWB reception unit 402, an ultra-short-range wideband antenna 404, and an apparatus main unit 405. The apparatus has a function for starting data transfer in response to the detection of a distance by the apparatus.

The UWB transmission unit 401 and the UWB reception unit 402 execute the following processing: UWB RF processing of executing modulation/demodulation processing for transmission signals; UWB baseband processing that includes modulation/demodulation processing, synchronization processing and propagation path measurement for baseband signals; UWB MAC layer processing of executing access control and adaptive control of the transmission rate; and UWB DLC layer processing of executing management of neighboring nodes, encryption, and authentication processing.

In the present embodiment, when a communication target apparatus including a UWB wireless device exists within such a distance from an apparatus similarly including a UWB wireless device that communication between the apparatuses is possible, the apparatus can recognize the existence of the communication target wireless device through polling operation before start of data transmission, and can start the data transfer after authentication processing.

FIG. 11 shows one example of an operation procedure of an apparatus for detecting a communication target apparatus by using a polling function. In the illustrated example, data transmission based on a UWB communication system is carried out between terminals A and B each including a UWB wireless device.

Initially, the terminal A to request communication start sends a connection request packet (Con. Req.) indicating a request for communication start.

When the terminal B to receive the communication start request is in a situation of being unable to receive the connection request packet, the terminal B is regarded as being outside the communication-possible distance range. In this case, the terminal A may not acknowledge the reception by the terminal B, and therefore continues to retransmit connection request packets.

In contrast, if the terminal B receives the connection request packet form the terminal A, the terminal B notifies its host CPU of the reception of the connection request packet form the terminal A, and recognizes the terminal A.

Furthermore, the terminal B sends a connection accept (Con. Acc.) for authorizing connection as a reply to the connection request from the terminal A.

Upon reception of the connection accept sent from the terminal B, the terminal A notifies its host CPU of the reception of the connection accept indicating connection authorization from the terminal B, to thereby recognize that the terminal B exists within the communication-possible range and hence connection thereto is possible.

Thereafter, the terminal A that has received the connection accept notifies the terminal B, which has authorized connection thereto, of the reception of the connection accept (connection authorization response), i.e., the terminal A transmits a connection accept response.

Thus, the terminal B that has authorized connection thereto re-recognizes the terminal A. If the connection accept is regarded as the connection authorization response, the connection accept response may be omitted.

In this manner, in the above-described communication terminal detection system, when one terminal sends a connection request packet and the other terminal receives the packet, the other terminal transmits a connection authorization packet to the terminal that has sent the connection request packet, which establishes connection between the terminals A and B.

Subsequent to the detection of a communication target by an apparatus by use of a polling function, an operation procedure for starting data transfer is implemented. This operation procedure can employ e.g. an RTS/CTS procedure similarly to the above description. Specifically, initially an RTS packet is transmitted from the UWB transmission unit 401 of the apparatus as the data transmission source to the apparatus as the data transmission destination, followed by return of a CTS packet from the data transmission destination apparatus that has received the RTS packet.

Upon reception of the CTS packet, the UWB reception unit 402 recognizes that the data transmission destination has been ready to receive packets, and a distance measurement unit 403 measures the distance from the data transmission destination apparatus based on the UWB signal that has carried the CTS packet.

Subsequently, if it has been confirmed that the CTS packet has been received without any trouble, and the distance from the data transmission destination apparatus is within such a range that high-transmission-rate and high-quality transmission is possible, the UWB transmission unit 401 executes transmission processing for transmission data prepared from the upper layer protocol.

In this manner, in the data transfer system according to an embodiment that employs a polling function instead of a ranging function, the apparatus to carry out data communication includes an antenna and a UWB wireless device that allow transmission of UWB wireless signals even across an ultra-short distance, and starts data transfer after detecting a communication target.

Figure 5:
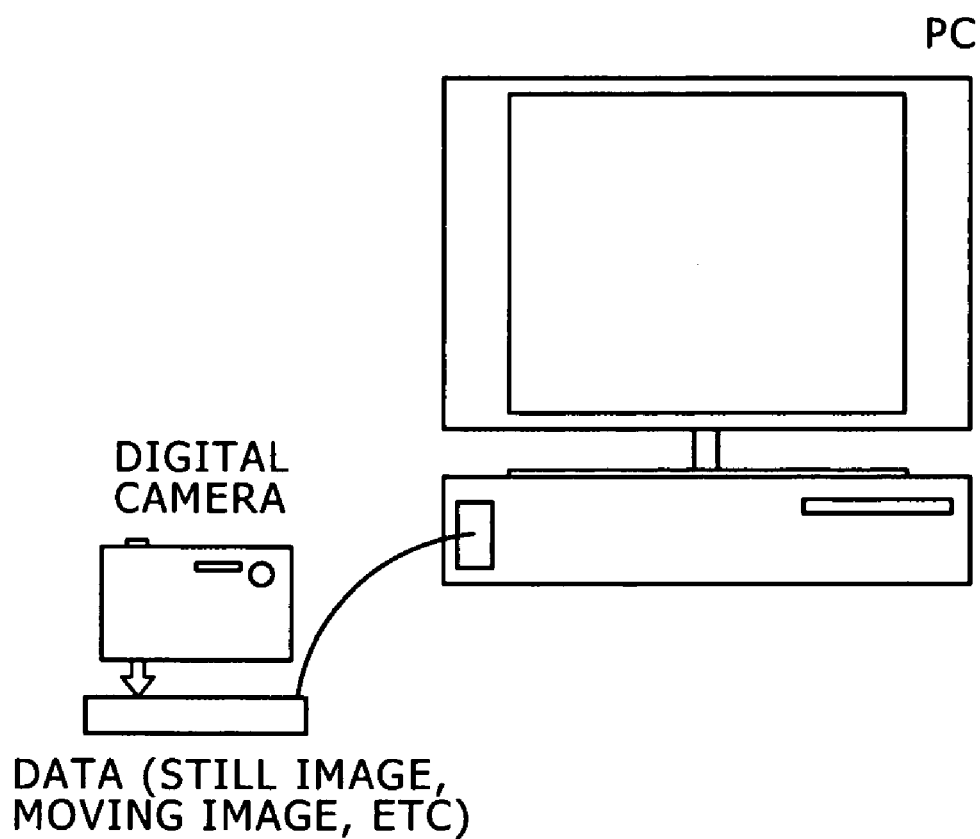
FIG. 5 is a diagram illustrating one practical use example in which data transfer is started in response to operation of "bringing closer" for an apparatus.

FIG. 5 shows one practical use example of a data transfer system according to one embodiment of the invention in which data transfer is started in response to the operation of "bringing closer" for an apparatus.

In this illustrated example, each of a digital camera and a cradle includes a UWB wireless device. The cradle is coupled to a television or personal computer via a cable, and transfers image data by use of UWB short-range communication. By disposing the digital camera on the cradle, they can be fixed with such a short distance therebetween that high-transmission-rate and high-quality transmission is allowed therebetween.

After still images and moving images are captured by the digital camera, the digital camera is set to the cradle. Subsequently, in accordance with a processing procedure like one shown in FIG. 4, the data of the images is transmitted from the digital camera to the cradle by UWB communication, followed by being transferred from the cradle to the television or personal computer.

Figure 6:
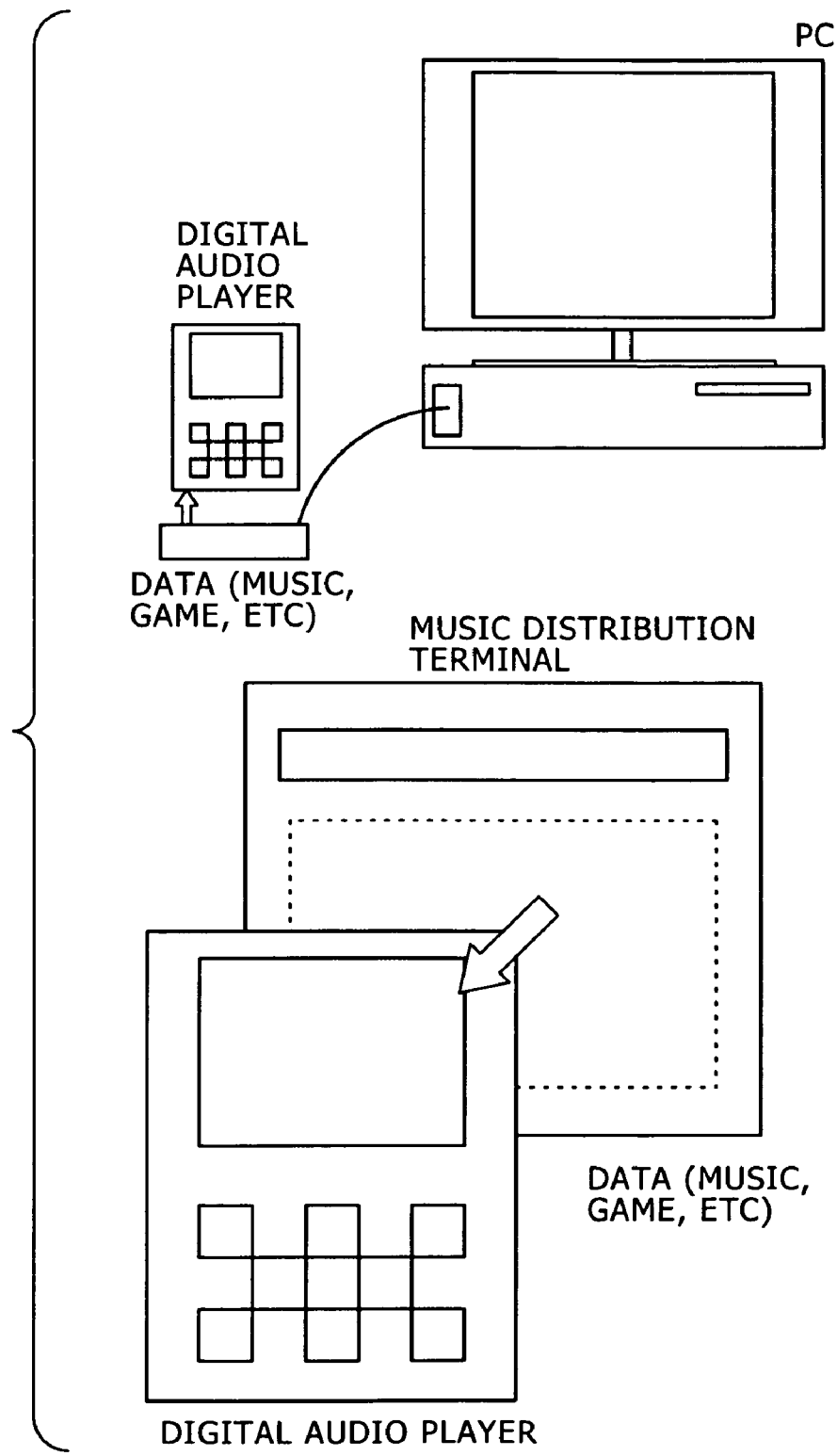
FIG. 6 is a diagram illustrating another practical use example in which data transfer is started in response to operation of "bringing closer" for an apparatus.

FIG. 6 shows another practical use example in which data transfer is started in response to the operation of "bringing closer" for an apparatus.

In this illustrated example, each of a digital audio player and a cradle includes a UWB wireless device. The cradle is coupled to a personal computer via a cable, and transfers music data. Alternatively, each of a digital audio player and a music distribution terminal includes a UWB wireless device, and music data is transferred therebetween. In the case of the former system, by disposing the digital audio player on the cradle, they can be fixed with such a short distance therebetween that high-transmission-rate and high-quality transmission is allowed therebetween.

Stored in the personal computer and music distribution terminal is music data that can be reproduced by the digital audio player. The digital audio player is set to the cradle, or is brought closer to the music distribution terminal. Subsequently, in accordance with a processing procedure like one shown in FIG. 4, music data is transmitted from the personal computer to the digital audio player via the cradle by UWB communication. Alternatively, the music data is directly transmitted from the music distribution terminal to the digital audio player. It should be obvious that not only the music data but also game data and other data can be transferred.

When short-range data transmission by the UWB is carried out as described above, the apparatuses each including a UWB wireless device are often brought close to each other so that the distance therebetween becomes 10 mm or less, or so that the casings of the apparatuses are brought into contact with each other. Therefore, the antenna used in the UWB wireless device should be small enough to be contained in the apparatus. In addition, the antenna needs to have such a wideband property as to be capable of transmitting wireless signals of a transmission rate of 100 Mbps or more, and needs to maintain the property even in an ultra-short range.

In general, when antennas are disposed close to each other, each of the antennas receives radio waves reflected by the ground layer of the opposite antenna, and therefore fails to obtain favorable characteristics regarding both the reflection characteristic and coupling characteristic. Furthermore, in electromagnetic waves in a near field within one wavelength from the generation source of the electromagnetic waves, the electric field and magnetic field are independent of each other, and hence the space impedance does not take a constant value. Accordingly, it is difficult to design an antenna so that desired properties are achieved in the operating frequency band.

In addition, general users desire that, in a data transfer system that detects the distance between the apparatuses and starts communication when the distance becomes a certain specified value, as stable and secured communication as possible be implemented. Therefore, communication should be implemented in the state in which the apparatuses are close to each other with an ultra-short distance therebetween, or in the state in which the casings of the terminals are in contact with each other. As described above, it is apparent that communication across an ultra-short distance offers a small propagation loss although involving deterioration of the properties of the antenna. Therefore, the communication across an ultra-short distance has an advantage of allowing data transmission at the maximum transmission rate of the system.

A description will be made below on a structural example of a small and integratable ultra-short-range antenna that has favorable reflection characteristic and coupling characteristic in an ultra-short range of 10 mm or less, and can be applied to the UWB wireless device according to the present embodiment.

As antennas with a small and thin structure, patch antennas and slot antennas have been known. However, both are basically a narrowband antenna of which operating band is about several percentages, and therefore widening of the band should be achieved. The slot antenna can offer a wider band than the patch antenna if the sizes of the both are the same. Therefore, the present inventor considers that the slot antenna is more suitable as an ultra-short-range UWB antenna used in a consumer apparatus.

Figure 7:
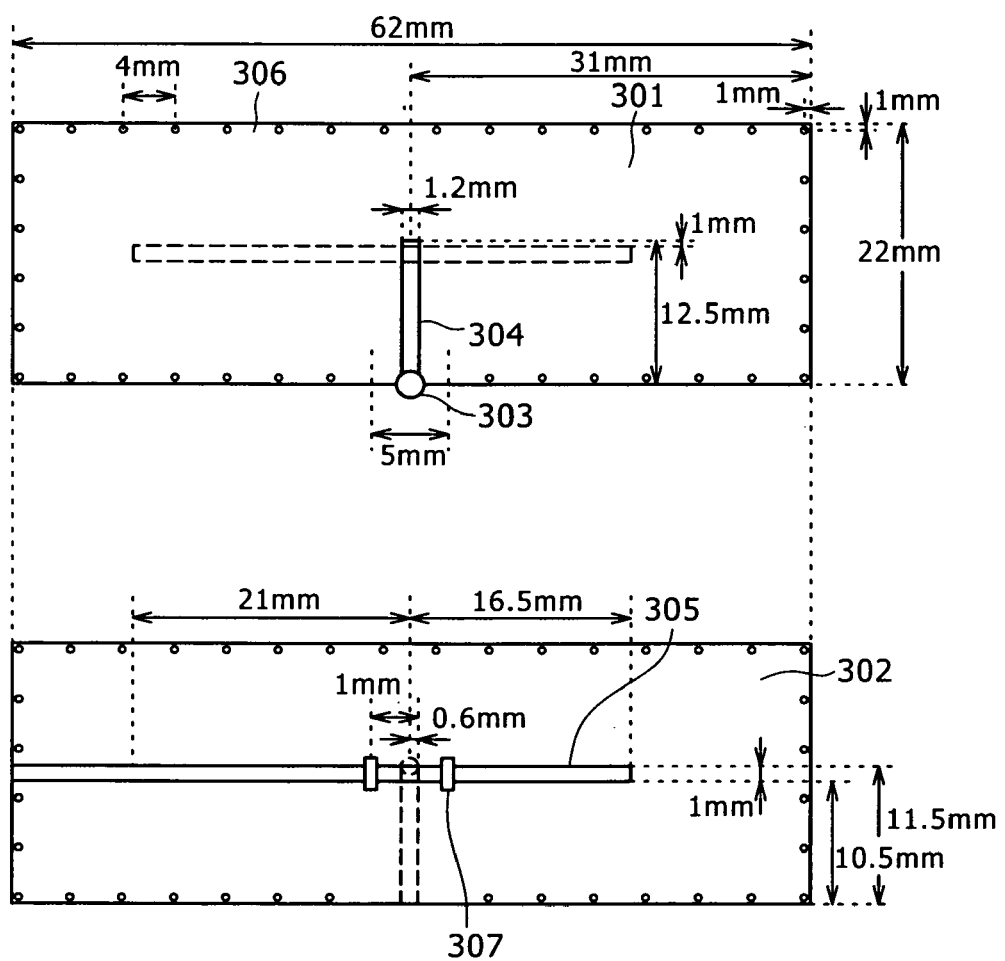
FIG. 7 is a diagram illustrating the surface structure of a slot antenna that can be applied to the data transfer system according to an embodiment of the invention.

FIG. 7 illustrates the surface structure of a slot antenna that can be applied to the data transfer system according to the embodiment of the present invention. The slot antenna shown in the drawing includes a dielectric substrate 301, a conductive pattern 306 formed on one face of the dielectric substrate 301, and a ground layer 302 formed on the other face of the dielectric substrate 301.

The dielectric substrate 301 is composed of e.g. a material called FR4, which is a glass fiber woven fabric impregnated with epoxy resin, and has a dielectric constant $\epsilon$ of 4.2 to 4.8.

The conductive pattern 306 is made up of a copper foil pattern that is formed along the periphery of the one face of the dielectric substrate 301. In the conductive pattern 306, a large number of through holes penetrating the dielectric substrate 301 are formed into a ring shape. These through holes are filled so that the conductive pattern 306 is coupled to the ground layer 302 formed on the backside of the dielectric substrate 301. The through holes are arranged with an interval of 4 mm.

On the one face of the dielectric substrate 301 having the conductive pattern 306 thereon, another copper foil pattern extending from peripheral part toward substantially the center of the dielectric substrate 301 is formed, and this copper foil pattern serves as a microstrip line 304. The microstrip line 304 is provided on the center line that halves the area of the rectangular dielectric substrate, and has a width of 1.2 mm for example.

Furthermore, in order to avoid intersecting between the conductive pattern 306 and the microstrip line 304, a pattern separation part having a width of 5 mm is provided near the end of the microstrip line 304 on the peripheral part, so that the copper foil pattern is adequately separated. The end of the microstrip line 304 on the peripheral part is located at substantially the center of the pattern separation part for the conductive pattern 306, and serves as a power feed point 303 for the conductive pattern 306.

The ground layer 302 is made up of a copper foil pattern that is formed on almost the entire face of the dielectric substrate 301 opposite to the face having the conductive pattern 306 thereon. A thin-line pattern is opened in substantially the center of the ground layer 302 so as to form a slot 305. In the illustrated example, the slot 305 is substantially perpendicular to the extension direction of the microstrip line 304, which is formed on the opposite face. The basic operational principle of the slot antenna is that an electromagnetic field is discharged mainly from the slot. Specifically, when power is fed to the microstrip line 304 via the power feed point 303, an electromagnetic field is discharged from the slot 305 and thus an electric field traversing the slot 305 is formed. This electric field produces stationary waves to resonate.

The slot 305 opened in the ground layer 302 is disposed in such a manner as to traverse the center line of the substrate passing through the power feed point 303. It is preferable that the specific layout of the slot 305, i.e., the lateral lengths from the power feed point 305 and the width, be optimized so that stable antenna properties are achieved. In the example illustrated in FIG. 7, the slot 305 has a width of 1 mm, and a total length of 37.5 mm. Furthermore, the slot 305 ranges from the position apart from the center of the ground layer 302 by 21 mm to the position apart from the center by 16.5 mm.

In addition, on the slot 305 opened in the ground layer 302, electric resistors 107 are mounted. The electric resistors 307 have a resistance value of e.g. 100Ω or more, and are disposed so that both the ends thereof are connected to the ground layer 302. The electric resistors 307 have an effect of suppressing reflection at the ground layer 302 to thereby exploit a wideband characteristic. In the example shown in FIG. 7, two electric resistors 307 are mounted at adequate positions near the center of the slot 305. Thus, flexibility in adjustment of the impedance match is achieved, and the antenna properties can be improved. When the center of the ground layer 302 is defined as the position of x=0 mm, and the left and right directions in FIG. 7 are defined as the positive and negative x directions, respectively, in the example shown in FIG. 7, the electric resistors 307 with a resistance of 150Ω or more are mounted at the positions of x=−0.6 mm and x=+1.0 mm, respectively, on the slot 305.

When the slot antenna shown in FIG. 7 is applied as a built-in antenna in an apparatus, there is a need to remove influence of electromagnetic waves from peripheral circuits in the apparatus and influence of reflectors around the apparatus. Furthermore, there is also a need to consider influence given to peripheral high-frequency circuits by high-frequency components of the emitted wideband waves. Therefore, when the slot antenna is incorporated into a consumer apparatus or the like, a metal shield case (not shown) covering the conductive pattern 306 may be provided.

If an antenna is incorporated into a portable apparatus such as a small digital camera or music player, the situation in which communication is carried out while the apparatus is grasped by a user's hand is possible. Furthermore, when a small apparatus is provided with a wireless communication function, circuits other than an antenna are also incorporated into the apparatus. Even if communication is implemented while the environment around the antenna is changing, and metal reflectors exist around the apparatus, the provision of a metal shield case allows stable achievement of desired antenna properties.

Main purposes of the slot antenna shown in FIG. 7 are to be used with being included in a consumer apparatus as e.g. a low band (3.1 to 4.9 GHz) UWB antenna, and to be applied to wireless data transmission across an ultra-short distance. In these use cases, in order to ensure high-capacity communication over 100 Mbps like the UWB communication, the antenna needs to be designed so that the following requirements are satisfied: the reflection characteristic is such that the reflection coefficient is lower than −10 dB in a wideband of the predetermined specification; there is no sharp gain attenuation in the coupling characteristic; and the entire gain is higher than a certain level.

Figure 8:
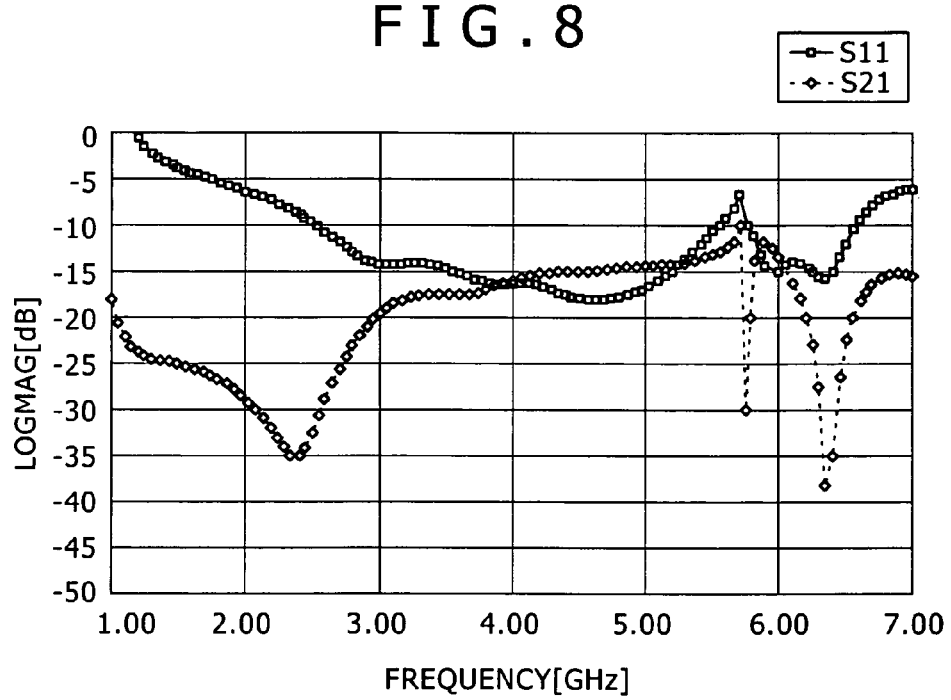
FIG. 8 is a diagram showing simulation results about S-parameters of the ultra-short-range UWB antennas shown in FIG. 7 that are separated from each other by 5 mm.

FIG. 8 shows simulation results about S-parameters of the ultra-short-range UWB antennas shown in FIG. 7 that are separated from each other by 5 mm. As is apparent from FIG. 8, even when the antennas are used with an ultra-short distance of 5 mm therebetween, the reflection coefficient is under −10 dB and the propagation loss is as high as −20 dB in a band of 3.1 to 4.9 GHz, which is the use band of the UWB low band. Furthermore, it has been confirmed that, in such a UWB communication environment that only white additive noise is superimposed on wireless signals, transmission in the maximum transmission rate mode (500 Mbps) is possible in a range of the propagation loss up to −64 dB.

Figure 9:
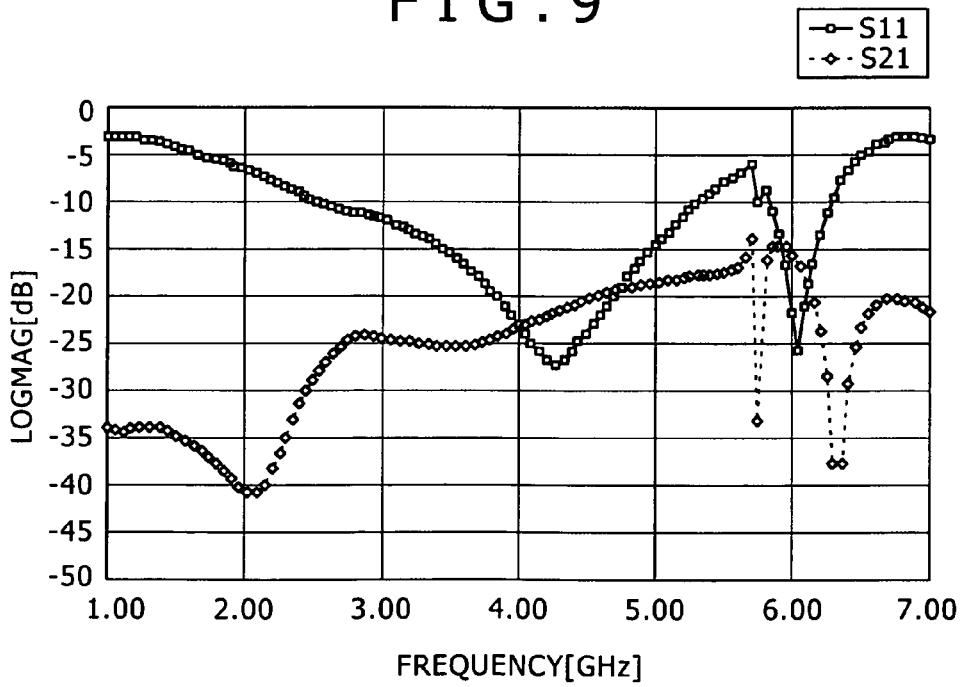
FIG. 9 is a diagram showing simulation results about S-parameters of the ultra-short-range UWB antennas shown in FIG. 7 that are separated from each other by 10 mm.

FIG. 9 shows simulation results about S-parameters of the ultra-short-range UWB antennas shown in FIG. 7 that are separated from each other by 10 mm. As is apparent from FIG. 9, also when the distance between the antennas is 10 mm, the reflection coefficient is lower than −10 dB, and a favorable coupling characteristic is achieved similarly.

If antennas having the same structure are used as a coupler (one pair) for transmission and reception, influence when the slots 305 of both the slot antennas are not opposed to each other is of concern. However, it has been confirmed that similar antenna properties can be obtained even when there is an offset of the orientation direction and angle of the antennas.

By thus applying the slot antenna shown in FIG. 7 to a data transfer system, UWB wireless signal transmission can be implemented without suffering from deterioration of antenna properties even when the terminals for communication are very close to each other. Furthermore, since antenna properties are ensured even when the terminals are close to each other, transmission with a small propagation loss and a high transmission rate is possible.

The present invention has been described above in detail with reference to a specific embodiment of the invention. It should be apparent that various modifications and substitutions might be incorporated into the embodiment by those skilled in the art without departing from the scope and spirit of the invention.

In the present specification, a description has been made by taking as an example a data transfer system that includes the digital audio player 1001 including a UWB wireless device and the cradle 1002 similarly including a UWB wireless device. However, the gist of the invention is not limited thereto. The present invention can be similarly applied to a system in which mobile or consumer apparatuses that each include a UWB wireless device and are close to each other transmit high-capacity data by wireless at a high speed and with a high quality.

That is, the embodiments of the invention have been disclosed merely for the purpose of exemplification. Therefore, the description in the present specification should not be interpreted to limit the scope of the invention. The appended claims should be consulted to determine the gist of the invention.

What is claimed is:

1. A data transfer system in which wireless data transmission is carried out between a first device and a second device that each include an ultra wideband (UWB) wireless device which includes an ultra-short-range wideband antenna, the data transfer system comprising:
   a ranging section, provided in the UWB wireless device of at least one of the first and second devices, configured to measure a distance to the other of the first and second devices;
   a determination section configured to determine, based on a measurement result by the ranging section, whether or not the first device is in or on the second device; and
   a data transfer section configured to establish, using the ultra-short-range wideband antenna, a connection between the first and second devices when the first device is in or on the second device,
   wherein the ultra-short-range wideband antenna's characteristics regarding both a reflection characteristic and coupling characteristic become favorable for the UWB communication in a near field within one wavelength of a frequency used in the UWB communication.

2. The data transfer system according to claim 1, further comprising:
   an authentication section configured to execute authentication processing between the first and second devices that are within such a distance from each other as to be capable of communicating with each other by use of the UWB wireless devices.

3. The data transfer system according to claim 1, further comprising:
   a fixing section configured to fix the distance between the first and second devices at a distance within the predetermined range.

4. The data transfer system according to claim 3, wherein the fixing section allows the first device to be housed in the second device to thereby fix the first and second devices so that the distance between the first and second devices is within the predetermined range.

5. A data transfer system in which wireless data transmission is carried out between a first device and a second device that each include an ultra wideband (UWB) wireless device which includes an ultra-short-range wideband antenna, the data transfer system comprising:
- a recognition section, included in at least one of the first and second devices, configured to recognize that the first device is in or on the second device; and
- a data transfer section configured to start, when a distance between the first and second devices is within a predetermined range, data transmission, using the ultra-short-range wideband antenna, between the first and second devices in response to a recognition that the first device is in or on the second device,
- wherein the ultra-short-range wideband antenna's characteristics regarding both a reflection characteristic and coupling characteristic become favorable for the UWB communication in a near field within one wavelength of a frequency used in the UWB communication.

6. The data transfer system according to claim 5, wherein at least one of the first and second devices detects the communication target apparatus by using a polling function to thereby allow the recognition section to recognize the existence of the communication target wireless device.

7. The data transfer system according to claim 1 or 5, wherein
- an RTS/CTS method is used in the wireless data transmission, and
- the ranging section measures the distance based on a UWB signal that has carried a CTS packet that is sent from the other of the first and second devices as a data transmission destination after an RTS packet is sent from the one of the first and second devices as a data transmission source.

8. A wireless communication device comprising:
- an ultra wideband (UWB) communication unit that transmits and receives a UWB signal using an ultra-short-range wideband antenna;
- a ranging section configured to measure a distance to a communication target apparatus based on a transmitted or received UWB signal;
- a determination section configured to communicate, based on a measurement result by the ranging section, whether or not the wireless communication device is in or on the communication target apparatus; and
- a data transfer section configured to execute data transmission in response to a determination by the distance determination section that the wireless communication device is in or on the communication target apparatus,
- wherein the ultra-short-range wideband antenna's characteristics regarding both a reflection characteristic and coupling characteristic become favorable for the UWB communication in a near field within one wavelength of a frequency used in the UWB communication.

9. The wireless communication device according to claim 8, further comprising:
- an authentication section configured to execute authentication processing with the communication target apparatus that is within such a distance from the wireless communication device that the wireless communication device is allowed to communicate with the communication target apparatus by the UWB communication unit.

10. The wireless communication device according to claim 8, further comprising:
- a fixing section configured to fix the communication target apparatus so that the distance to the communication target apparatus is within the predetermined range.

11. The wireless communication device according to claim 10, wherein
the fixing section allows the wireless communication device to be housed in the communication target apparatus device to be housed in the communication target apparatus.

12. A wireless communication device comprising:
- an ultra wideband (UWB) communication unit that transmits and receives a UWB signal using an ultra-short-range wideband antenna;
- a recognition section configured to recognize that the wireless communication device is in or on a communication target apparatus; and
- a data transfer data transmission by use of the UWB communication unit in response to a recognition of the communication target apparatus by the recognition section,
- wherein the ultra-short-range wideband antenna's characteristics regarding both a reflection characteristic and coupling characteristic become favorable for the UWB communication in a near field within one wavelength of a frequency used in the UWB communication.

13. The wireless communication device according to claim 12, wherein
the recognition section detects the communication target apparatus by using a polling function to thereby recognize existence of a communication target wireless device.

14. The wireless communication device according to claim 8 or 12, wherein
- an RTS/CTS method is used in the data transmission, and
- the ranging section measures the distance based on a UWB signal that has carried a CTS packet that is sent from the communication target apparatus after transmission of an RTS packet.

15. A wireless communication method for carrying out wireless data transmission between apparatuses by use of ultra wideband (UWB) communication, the method comprising the steps of:
- measuring a distance to a communication target apparatus based on a transmitted or received UWB signal;
- determining, based on a measurement result in the measuring, whether or not the wireless communication device is in or on the communication target apparatus; and
- executing short-range data transmission, using an ultra-short-range wideband antenna, with a throughput equal to or higher than a predetermined throughput by UWB communication in response to determining that the wireless communication device is in or on the communication target apparatus,
- wherein the ultra-short-range wideband antenna's characteristics regarding both a reflection characteristic and coupling characteristic become favorable for the UWB communication in a near field within one wavelength of a frequency used in the UWB communication.

16. The wireless communication method according to claim 15, further comprising the step of:
executing authentication processing with the communication target apparatus that is within such a distance that communication to the communication target apparatus by UWB communication is possible.

17. A wireless communication method for carrying out wireless data transmission between apparatuses by use of ultra wideband (UWB) communication, the method comprising the steps of:
- recognizing that the wireless device is in or on a communication target apparatus, the communication target apparatus fixing a distance between the wireless device and the communication target apparatus such that communication to the communication target apparatus is possible; and starting data transmission, when the communication target is within the distance, by use of the UWB communication and an ultra-short-range wideband antenna in response to a recognition of the communication target apparatus in the recognizing step, and wherein the ultra-short-range wideband antenna's characteristics regarding both a reflection characteristic and coupling characteristic become favorable for the UWB communication in a near field within one wavelength of a frequency used in the UWB communication.

18. The wireless communication method according to claim 17, wherein in the recognizing step, the communication target apparatus is detected by using a polling function to thereby recognize existence of a communication target wireless device.

19. The wireless communication method according to claim 15 or 17, wherein an RTS/CTS method is used in the wireless data transmission, and in the measuring, the distance is measured based on a UWB signal that carried a CTS packet that is sent from the communication target apparatus after transmission of an RTS packet.

20. A non-transitory computer readable medium storing a computer program for carrying out wireless data transmission between apparatuses by use of ultra wideband (UWB) communication is executed on a computer system, the computer program causing the computer system to execute the steps of:

measuring a distance to a communication target apparatus based on a transmitted or received UWB signal;

determining, based on a measurement result in the measuring, whether or not a device is located in or on the communication target apparatus; and executing short-range data transmission, using an ultra-short-range wideband antenna, with a throughput equal to or higher than a predetermined throughput by UWB communication in response to a determination in the determining the device is located in or on the communication target apparatus, wherein the ultra-short-range wideband antenna's characteristics regarding both a reflection characteristic and coupling characteristic become favorable for the UWB communication in a near field within one wavelength of a frequency used in the UWB communication.

21. A non-transitory computer readable medium storing a computer program for carrying out wireless data transmission between apparatuses by use of ultra wideband (UWB) communication is executed on a computer system, the computer program causing the computer system to execute the steps of:

recognizing that the wireless device is in or on a communication target apparatus, the communication target apparatus fixing a distance between the wireless device and the communication target apparatus such that communication to the communication target apparatus is possible; and starting data transmission, when the communication target is within the distance, by use of the UWB communication and an ultra-short-range wideband antenna in response to a recognition of the communication target apparatus in the recognizing step, and wherein the ultra-short-range wideband antenna's characteristics regarding both a reflection characteristic and coupling characteristic become favorable for the UWB communication in a near field within one wavelength of a frequency used in the UWB communication.

22. A data transfer system in which wireless data transmission is carried out between a first device and a second device that each includes a ultra wideband (UWB) wireless device, the data transfer system comprising:

a ranging unit that is provided in the UWB wireless device of at least one of the first and second devices and measures a distance to the other of the first and second devices;

a determination unit that determines, based on a measurement result by the ranging unit, whether or not the first device is in or on the second device; and a data transfer unit that establishes, using the ultra-short-range wideband antenna, a connection between the first and second devices when the first device is in or on the second device, wherein the ultra-short-range wideband antenna's characteristics regarding both a reflection characteristic and coupling characteristic become favorable for the UWB communication in a near field within one wavelength of a frequency used in the UWB communication.

23. A data transfer system in which wireless data transmission is carried out between a first device and a second device that each include a ultra wideband (UWB) wireless device, the data transfer system comprising:

a recognition unit that is included in at least one of the first and second devices and recognizes that the first device is in or on the second device; and a data transfer unit that starts, when a distance between the first and second devices is within a predetermined range, data transmission, using an ultra-short-range wideband antenna, between the first and second devices in response to a recognition of the first device is in or on the second device through the recognition unit and, wherein the ultra-short-range wideband antenna's characteristics regarding both a reflection characteristic and coupling characteristic become favorable for the UWB communication in a near field within one wavelength of a frequency used in the UWB communication.

24. A wireless communication device comprising:

an ultra wideband (UWB) communication unit that transmits and receives a UWB signal;

a ranging unit that measures a distance to a communication target apparatus based on a transmitted or received UWB signal;

a determination unit that determines, based on a measurement result by the ranging unit, whether or not the wireless communication device is in or on the communication target apparatus; and a data transfer unit that executes data transmission, using an ultra-short-range wideband antenna, in response to a determination that the wireless communication device is in or on the communication target device, wherein the ultra-short-range wideband antenna's characteristics regarding both a reflection characteristic and coupling characteristic become favorable for the UWB communication in a near field within one wavelength of a frequency used in the UWB communication.

25. A wireless communication device comprising:

an ultra wideband (UWB) communication unit that transmits and receives a UWB signal;

a recognition unit that recognizes that the wireless communication device is in or on a communication target apparatus; and a data transfer unit that starts, when the wireless communication device is in or on the target apparatus, data transmission by use of the UWB communication unit in response to a recognition of the communication target apparatus by the recognition unit,
wherein an ultra-short-range wideband antenna's characteristics regarding both a reflection characteristic and coupling characteristic become favorable for the UWB communication in a near field within one wavelength of a frequency used in the UWB communication.

* * * * *